Oct. 24, 1961  H. T. BUTLER, JR  3,005,906
HUB CAP ORNAMENT
Filed Aug. 19, 1959

Hardie T. Butler, Jr.
INVENTOR.

BY *[signatures]*
Attorneys

United States Patent Office 3,005,906
Patented Oct. 24, 1961

3,005,906
HUB CAP ORNAMENT
Hardie T. Butler, Jr., 2015 Conrad Ave. SE.,
Atlanta, Ga.
Filed Aug. 19, 1959, Ser. No. 834,870
3 Claims. (Cl. 240—8.12)

This invention relates to new and useful improvements in motor vehicle hub cap ornaments and has for its primary object to provide, in a manner as hereinafter set forth, a device of this character which closely resembles a space rocket in firing position when the vehicle is stationary but which, when said vehicle is in motion, automatically assumes and maintains the position of a rocket in flight.

Another very important object of the present invention is to provide a hub cap ornament of the aforementioned character comprising novel self-contained illuminating means whereby the rocket-like appearance of the device is greatly enhanced, particularly at night.

Still another important object of the invention is to provide an ornament of the character described which is adapted to be mounted expeditiously on conventional motor vehicle hub caps without the necessity of materially altering same structurally.

Other objects of the invention are to provide a motor vehicle hub cap ornament which will be comparatively simple in construction, strong, durable, compact, of light weight, attractive in appearance and which may be manufactured at low cost.

Figure 1:
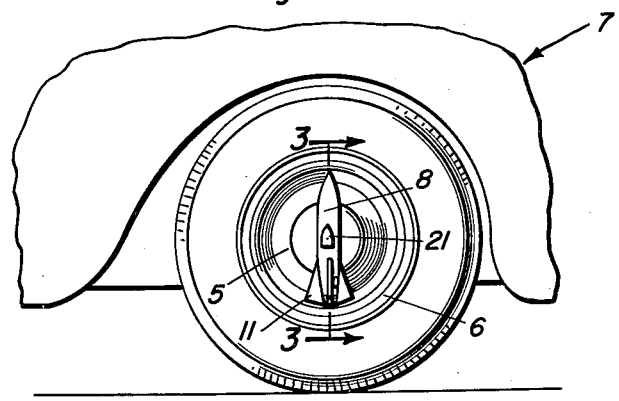
Figure 3:
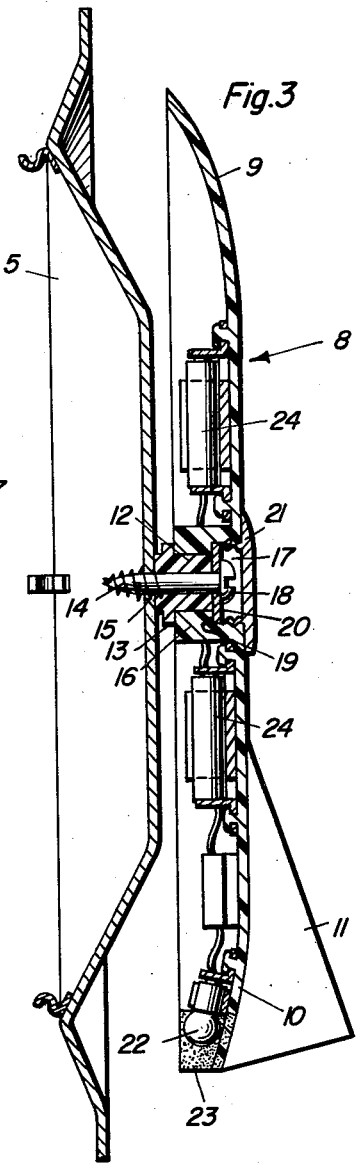
Figure 4:
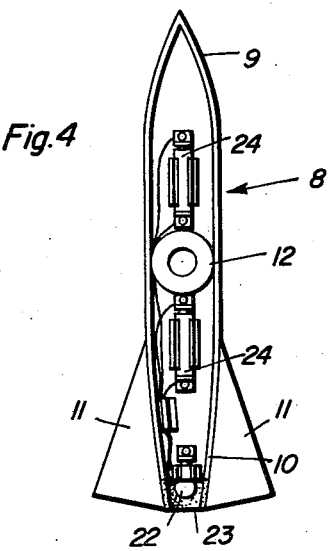

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of a motor vehicle wheel equipped with a hub cap ornament embodying the present invention, showing the device in a vertical position as when the vehicle is stationary;

FRIGURE 2 is a side elevational view substantially similar to FIGURE 1 but showing the hub cap ornament in horizontal, forwardly projecting position as when the vehicle is in motion;

FIGURE 3 is a vertical sectional view on an enlarged scale, taken substantially on the line 3—3 of FIGURE 1; and FIGURE 4 is an elevational view of the ornament per se, looking at the inner side thereof.

Referring now to the drawing in detail, it will be seen that reference character 5 designates generally a conventional motor vehicle wheel plate or hub cap. The hub cap 5 is mounted in the usual manner on a wheel 6 of an automobile 7.

The embodiment of the present invention which has been illustrated comprises an elongated shell or bar 8 of generally U-shaped or semi-circular cross-section, said bar being of a suitably colored, opaque plastic or other material. The bar or shell 8 may also be of any desired dimensions. The bar or shell 8 includes rounded off front and rear end portions 9 and 10, respectively. Fins or vanes 11 are fixed longitudinally on the rear end portion 10 of the bar or shell 8. The purpose of the fins or vanes 11 will be presently set forth. When viewed in elevation from the outer side thereof, the shell 8 closely resembles a space rocket.

The shell 8 is mounted for rotation in a vertical plane on the outer side of the hub cap 5. Toward this end, a tubular spindle or stub shaft 12 is mounted centrally on the hub cap 5. The inner portion of the tubular spindle 12 is provided with a circumferential flange 13. A screw 14 secures the tubular spindle 12 in position on the hub cap 5. The screw 14 is threaded through a centrally located hole 15 which is provided therefor in the hub cap 5. The shell 8 has formed therein, at an intermediate point, a hub or bearing 16 which is journaled on the spindle 12 and which abuts the flange 13. The hub 16 has its outer portion recessed, as indicated at 17, to accommodate the head of the screw 14. Thus, a shoulder 19 is provided in the hub 16. A retaining disc or washer 20 is interposed between the screwhead 18 and the hub 6 for retaining the shell 8 on said hub, said disc or washer abutting the shoulder 19. A removable cover or closure plate 21 for the recess 17 conceals the elements 18, 20, etc.

Mounted in the rear or tail portion of the shell 8 is an incandescent electric lamp 22. The shell 8 comprises a tail section 23 of a red light transmitting plastic within which the lamp 22 is located. Mounted in the shell 8 on opposite sides of the pivotal mounting 12 thereof is a plurality of dry cell batteries 24. The batteries 24 are electrically connected to the lamp 22 for energizing same. Any suitable means may, if desired, be provided for controlling the electric circuit to the lamp 22.

Figure 2:
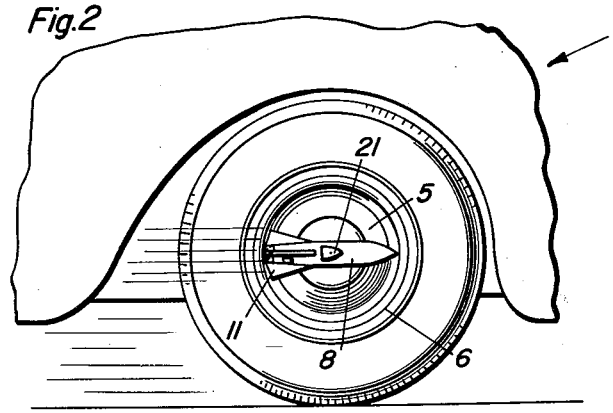

It is thought that the operation of the ornament will be readily apparent from a consideration of the foregoing. Briefly, the construction and arrangement is such that the rear or lower end portion 10 is heavier than the end portion 9. Thus, the shell 8 is maintained by gravity in a vertical position as shown in FIGURE 1 of the drawing when the vehicle 7 is motionless. Thus, the device has the appearance of a space rocket in firing position. However, when the vehicle 7 moves forwardly and attains sufficient speed the air flowing past the wheel 6 strikes the fin or vane 11 projecting outwardly from the side of the shell 8 remote from the hub cap 5 with sufficient force to swing the shell 8 to a horizontal, forwardly directed position as shown in FIGURE 2 of the drawing. The ornament now has a realistic appearance of a rocket in flight and the outwardly projecting fin 11 will maintain the ornament in this position as long as sufficient speed of the vehicle is maintained. This realistic appearance is further enhanced by the electric lamp 22 which illuminates the rear end portion of the device and the adjacent area in red light through the section 23 of the shell 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a vehicle hub cap, a stub shaft provided with an axial bore and having inner and outer ends, a headed screw extending inwardly through said bore into an aperture formed at the center of the hub cap and securing said stub shaft to the latter, an outturned annular shoulder provided at the inner end of said stub shaft, a washer positioned on said screw between the screw head and the outer end of the stub shaft, said washer being of a greater diameter than the stub shaft whereby to project radially outwardly beyond the same, an elongated ornament provided intermediate its ends with a hub having a bearing portion rotatably mounted on said stub shaft between said annular shoulder and said washer and also having a counterbore at the outside of said bearing portion accommodating said washer and the head of said screw, one end portion of said ornament being heavier than the other whereby the ornament may assume a vertical position when the associated vehicle is not in motion, and an air flow responsive fin provided on said one end portion of the ornament for swinging the latter to a horizontal position during motion of the associated vehicle.

2. The device as defined in claim 1 together with a removable closure cap provided in the counterbore of the hub of said ornament.

3. The device as defined in claim 1 together with an electric lamp carried by said ornament, and a battery carried by the ornament in circuit with said lamp.

References Cited in the file of this patent

UNITED STATES PATENTS

| | | |
|---|---|---|
| 1,671,770 | Levien | May 29, 1928 |
| 1,739,577 | Cantu | Dec. 17, 1929 |
| 1,747,433 | Genest | Feb. 18, 1930 |
| 2,169,237 | Gasco | Aug. 15, 1939 |
| 2,422,540 | Golba | June 17, 1947 |
| 2,661,417 | Blackburn | Dec. 1, 1953 |
| 2,921,182 | Taylor | Jan. 12, 1960 |